US010634580B2

(12) United States Patent
Goodman

(10) Patent No.: US 10,634,580 B2
(45) Date of Patent: Apr. 28, 2020

(54) SYSTEMS AND METHODS FOR ANALYZING FLUTTER TEST DATA USING DAMPED SINE CURVE FITTING WITH THE CLOSED FORM SHAPE FIT

(71) Applicant: The Boeing Company, Chicago, IL (US)

(72) Inventor: Charles E. Goodman, Chesterfield, MO (US)

(73) Assignee: The Boeing Company, Chicago, IL (US)

(*) Notice: Subject to any disclaimer, the term of this patent is extended or adjusted under 35 U.S.C. 154(b) by 554 days.

(21) Appl. No.: 14/731,255

(22) Filed: Jun. 4, 2015

(65) Prior Publication Data
US 2016/0355278 A1 Dec. 8, 2016

(51) Int. Cl.
*G01M 5/00* (2006.01)
*B64D 45/00* (2006.01)
*B64F 5/60* (2017.01)
*G06F 17/17* (2006.01)

(52) U.S. Cl.
CPC .......... *G01M 5/0016* (2013.01); *B64D 45/00* (2013.01); *B64F 5/60* (2017.01); *G01M 5/0041* (2013.01); *G06F 17/17* (2013.01); *B64D 2045/0085* (2013.01)

(58) Field of Classification Search
CPC ...... G01M 5/0016; G01M 5/0041; B64F 5/60
USPC ................. 702/42, 48, 117, 54, 41
See application file for complete search history.

(56) References Cited

U.S. PATENT DOCUMENTS

| | | | |
|---|---|---|---|
| 6,947,858 B2 | 9/2005 | Goodman | |
| 8,131,491 B2 | 3/2012 | Goodman | |
| 8,898,040 B2* | 11/2014 | Larimore | G06F 17/5018 700/31 |
| 2004/0267497 A1* | 12/2004 | Goodman | G01M 5/0016 702/179 |
| 2013/0127847 A1* | 5/2013 | Jin | G06T 17/20 345/420 |
| 2013/0158891 A1 | 6/2013 | Niepokolczycki et al. | |

(Continued)

OTHER PUBLICATIONS

Bennett et al., "Application of a Flight Test and Data Analysis Technique to Flutter of a Drone Aircraft," NASA Technical Memorandum 83136, May 1981, pp. 1-10, NASA, Hampton, Virginia/USA.

Primary Examiner — Eman A Alkafawi
(74) Attorney, Agent, or Firm — Haynes and Boone, LLP

(57) ABSTRACT

System identification from free response time decay history data of a dynamic system employs a new closed form shape fit for solving the dynamic system free response decay equation. The closed form shape fit allows for the treatment of the mode shapes as linear coefficients and allows the mode shapes for each sensor to be computed independently, thereby reducing computation time. The closed form shape fit efficiently provides mode shapes for a large set of sensors based on a fit from a small set of sensors. The closed form shape fit combined with a non-linear fit of frequency and damping characteristics efficiently estimates the optimal solution, thereby reducing the time to completion of non-linear optimization. A nonlinear optimization can incorporate the closed form shape fit into determining the Jacobian matrix of sensitivities and evaluating the residuals, thereby reducing the number of parameters and reducing the time to completion of the non-linear optimization.

21 Claims, 9 Drawing Sheets

(56) References Cited

U.S. PATENT DOCUMENTS

2013/0181989 A1* 7/2013 Agarwal ................. G06T 17/00
                                                      345/420
2015/0203211 A1* 7/2015 Wu ........................ B64D 43/00
                                                      701/14

* cited by examiner

| Sensor data | | Freq/Damp terms $W_1\ D_1\ W_2\ D_2$ | | | | Excitation terms $A^E_{1,2}\ \phi^E_{1,2}\ A^E_{2,2}\ \phi^E_{2,2}$ | | | | Sensor 1 terms $C_{1,1}\ C_{1,2}\ A^O_{1,1}\ \phi^O_{1,1}\ A^O_{2,1}\ \phi^O_{2,1}$ | | | | | | Sensor 2 terms $C_{2,1}\ C_{2,2}\ A^O_{1,2}\ \phi^O_{1,2}\ A^O_{2,2}\ \phi^O_{2,2}$ | | | | | | Sensor 3 terms $C_{3,1}\ C_{3,2}\ A^O_{1,3}\ \phi^O_{1,3}\ A^O_{2,3}\ \phi^O_{2,3}$ | | | | | |
|---|---|---|---|---|---|---|---|---|---|---|---|---|---|---|---|---|---|---|---|---|---|---|---|---|---|---|
| Sensor 1 data | $Y_{1,1}$ | x | x | x | x | x | x | | | x | | x | x | x | x | | | | | | | | | | | | |
| | $Y_{1,2}$ | x | x | x | x | | | x | x | | | x | x | x | x | | | | | | | | | | | | |
| Sensor 2 data | $Y_{2,1}$ | x | x | x | x | x | x | | | | | | | | | x | | x | x | x | x | | | | | | |
| | $Y_{2,2}$ | x | x | x | x | | | x | x | | | | | | | | x | x | x | x | x | | | | | | |
| Sensor 3 data | $Y_{3,1}$ | x | x | x | x | x | x | | | | | | | | | | | | | | | x | | x | x | x | x |
| | $Y_{3,2}$ | x | x | x | x | | | x | x | | | | | | | | | | | | | | x | x | x | x | x |

200

201, 202, 203 (region labels)

FIG. 2

SYSTEMS AND METHODS FOR ANALYZING FLUTTER TEST DATA USING DAMPED SINE CURVE FITTING WITH THE CLOSED FORM SHAPE FIT

TECHNICAL FIELD

Embodiments of the present disclosure generally relate to system identification as the art and science of mathematically modeling dynamic systems from observed input-output data, and, more particularly, to flutter flight testing of aircraft structure vibration modes and determining the modal characteristics for each structural configuration at each particular flight condition, which can be used, for example, to estimate the aeroelastic stability margin of an aircraft.

BACKGROUND

Many types of engineered structures, such as skyscrapers, bridges, and aircraft airframes, are subject to vibrational stresses which can be caused by aerodynamic forces due to wind, for example, or due to the airspeed of an aircraft in flight. The aerodynamic forces over such structures may cause an unstable oscillatory aeroelastic deformation, or vibration, of the structure referred to as flutter. Flutter may involve different types of motion, or stress, such as bending or twisting, combinations of which may be referred to as a mode (e.g., mode of deformation) or vibrational mode.

In the case of an aircraft wing in flight, for example, the aeroelastic deformations may be relatively mild and stable within the normal operating envelope of the aircraft. In the case of flutter, however, the aeroelastic deformations may be driven into an unstable mode in which the torsional (e.g., twisting) motion, for example, extracts energy from the airstream that drives the particular vibrational mode (e.g., the torsional motion itself or a combination of the torsional motion with some other motion such as bending) to increasingly higher amplitudes, causing oscillations of increasing amplitude that may result in damage to the wing.

To reduce the likelihood of such situations, exhaustive flight and wind tunnel tests are usually conducted to observe and record the flutter characteristics of the various aeroelastic structures of an aircraft over the entire flight envelope of the aircraft and to predict a safe operating speed and altitude envelope for the aircraft. In such testing, a number and variety of types of sensors, or transducers, may be attached to the various structures of the aircraft, such as the wing, fuselage and empennage. Sensors may include accelerometers, strain gauges, temperature sensors, and speed indicators, for example. During flight testing, various excitations may be provided for the sensors, such as deflecting a control surface, e.g., an aileron, elevator, rudder, or flap, for example, by some specific amount. Correspondence between the excitations provided (input) and response from the sensors (output) is included in the flight test data. The flight test data, to be useful, needs to be analyzed, typically by computer. Often times during flight, however, analysis results are needed before any further or new excitations may be provided, in order, for example, to avoid endangering the aircraft and flight crew. A worst case scenario is that the test flight is shut down until computation of analysis results can be completed, upon which test flights may be resumed. Such interruptions can be expensive in terms of aircraft downtime and inefficient use of facilities such as airstrips and control tower, ground, and flight crews. Thus, there is a need in the testing of structures for aeroelastic deformation and vibration response (e.g., flutter testing)—which can also have benefits for the engineering and testing of other wind-loaded structures or structures subject to induced vibration, such as buildings and bridges—for computationally efficient and fast methods of analyzing and using flutter test data.

SUMMARY

In one or more embodiments, system identification from free response time decay data history of a dynamic system employs a new form of the dynamic system free response decay equation that allows for the treatment of the mode shapes as linear coefficients. The system identification further produces a block diagonal form of the matrix of sensitivities that allows the mode shapes for each sensor to be computed independently and greatly speeds up the system identification process. In another embodiment, a closed form shape fit can be used to provide mode shapes for a large set of sensors when the frequency and damping and excitation levels have been determined from a fit of a small set of sensors. In another embodiment, a nonlinear optimization, which may refer to a process of approximating a maximum or minimum—subject to one or more constraints or conditions—of some objective function, which may be a function of one or more variables, such as a Levenberg-Marquardt or damped least squares method, incorporates the closed form shape fit into determining the Jacobian matrix of sensitivities and into evaluating the residuals, which can reduce the time to completion of the nonlinear optimization. In general, the term "optimize" and its various forms (e.g., "optimization," "optimized," etc.) are used herein to indicate that the noted parameter, process, data, terms, and/or associated relationship are improved, adjusted, set, and/or enhanced (relative to their prior form), rather than to indicate perfection or absolute best possible, as would be understood by one skilled in the art.

In one embodiment, a computer-implemented method for system identification using a closed form shape fit includes: receiving a set of data obtained from a plurality of sensors; selecting a particular sensor from the plurality of sensors; gathering data from the set of data for the particular sensor for a group of excitations; formulating a linear least squares problem for the particular sensor for the group of excitations; solving the linear least squares problem for the particular sensor for the group of excitations; and extracting one or more mode shape terms to obtain mode shape information from the set of data for the particular sensor for the group of excitations.

In another embodiment, a system includes a plurality of sensors configured to provide a flutter test data from a structure subject to one or more excitation events, the flutter test data comprising machine-readable time history data corresponding to physical measurements taken by the sensors; and a computer processor configured to receive the machine-readable time history data and to execute a process, the process including: performing one or more fits of a series of damped sine curves to the time history data; computing a Fast Fourier Transform (FFT) of a fit error of a first fit of the one or more fits of the series of damped sine curves to the time history data; estimating a next damped sine curve to include in the series of damped sine curves; performing one or more iterations of a closed form shape fit to optimize—referring to a process of approximating optimal values of—mode shape terms and a first non-linear fit to optimize frequency and damping and excitation level terms for the series of damped sine curves; perform a second nonlinear fit of the series of damped sine curves, using the optimized frequency and damping and excitation level and mode shape terms, to the time history data; and output the results of the nonlinear fit.

In a further embodiment, a non-transitory computer-readable medium includes instructions which, in response to execution by a computer system, cause the computer system to: receive time history data corresponding to an excitation of a structure from a measurement taken by a sensor attached to the structure; formulate a linear least squares problem for the time history data from the sensor for the excitation; solve the linear least squares problem for the time history data from the sensor for the excitation; and extract one or more mode shape terms to obtain mode shape information about the structure from the time history data.

BRIEF DESCRIPTION OF THE DRAWINGS

FIG. 2 is a matrix sparsity diagram illustrating the relative independence, as between different sensors, for processing the closed form shape fit for each sensor, according to one embodiment.

Figure 1:
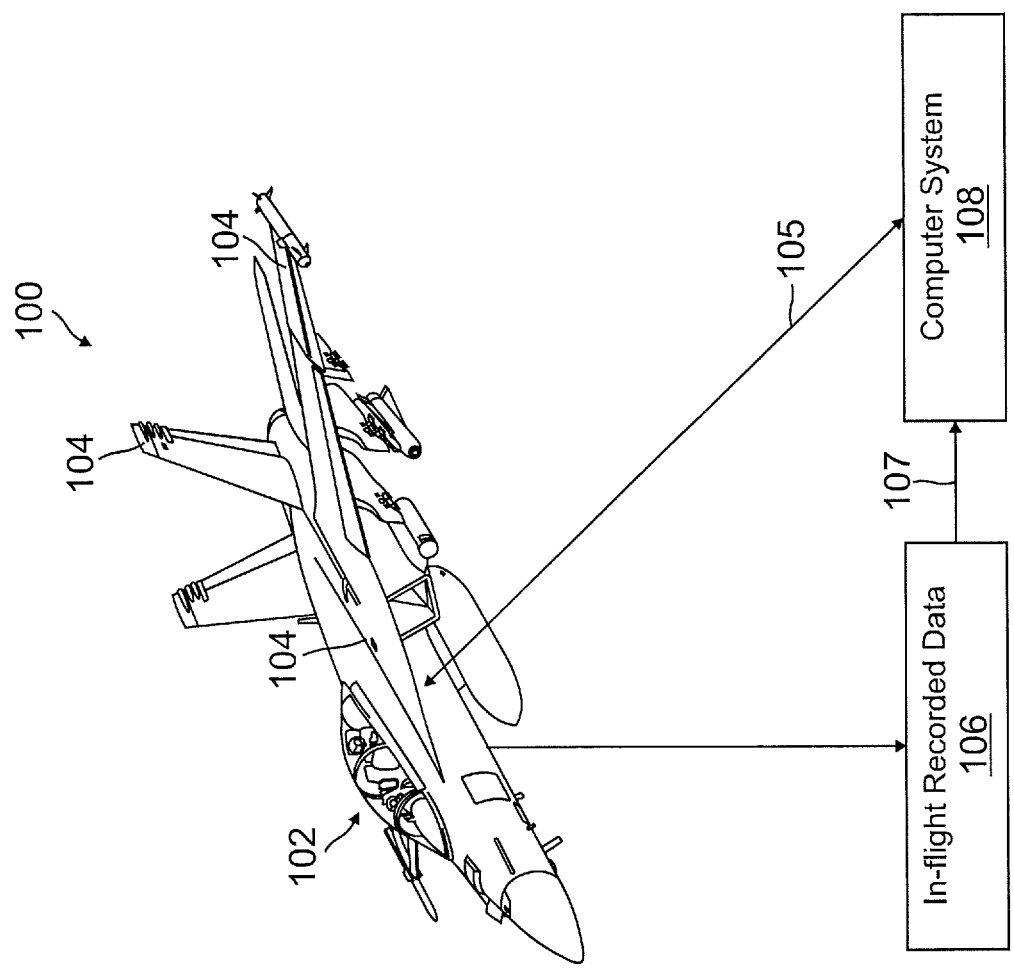
FIG. 1 is a general system diagram illustrating a system for system identification, in accordance with an embodiment of the disclosure.

Embodiments of the present disclosure and their advantages may be best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

The present disclosure describes, in general, one or more embodiments of system identification methods and systems with particular applicability to problems of analyzing flutter test data for aircraft structures, but which may also find more general applicability to any structure—such as bridges or tall buildings—with wind or air flow flutter responses.

One or more embodiments have application to system identification from free response time decay data history of a dynamic system. One such application is the typical flutter flight test for an aircraft. Flutter is an instability caused by the interaction of structural vibration modes and aerodynamic forces caused by those vibrations. For flutter testing, it is desired to identify the modal frequency, damping and mode shape of the aircraft at a variety of structural configurations under a variety of flight conditions. Typically, at each of the variety of structural configurations and flight conditions, multiple tests are conducted to excite the aircraft vibration modes and record the free response decay. The decay data may then be processed to determine the modal characteristics for each structural configuration at the particular flight condition. The results of determining the modal characteristics for each structural configuration and particular flight condition (e.g., mode shape information) may be made more useful through trend fitting or tracking of the modal frequency and damping.

Mode shape information can be very useful in performing the tracking (fitting a trend) of the modal frequency and damping. The frequency and damping trends may be used to estimate the aeroelastic stability margin of the aircraft (e.g., project the speed at which flutter may be expected to occur).

Prior art methods employ nonlinear optimization techniques to determine the frequency, damping, and mode shapes from dwell and decay flutter test data. The dwell and decay flutter test data may be acquired, for example, from a test that excites the structural modes (e.g., vibrational motion of a particular form or mode shape) and then ceases the excitation to allow the structural responses to die out. The decay of the vibrations produces a set of flutter time history data that can be modeled as a series of damped sine waves. The mode shape information is only determined for a sensor if the response data for that sensor is included in the nonlinear optimization. The number of unknowns in the nonlinear optimization is driven by the number of sensors included in the fit of the data to the model (e.g., series of damped sine waves). To obtain a good mode shape, prior art methods required a large number of sensors to be included in the nonlinear optimization. The large number of sensors required a large amount of time to compute, typically several hours on a dedicated computer, which, as described above, could be disruptive of flight tests and resource scheduling required for flight tests. Examples of systems and methods for system identification are given in U.S. Pat. No. 8,131,491 B2, issued Mar. 6, 2012, entitled "METHOD AND APPARATUS FOR EVALUATING DATA REPRESENTING A PLURALITY OF EXCITATIONS OF A PLURALITY OF SENSORS" and U.S. Pat. No. 6,947,858 B2, issued Sep. 20, 2005, entitled "METHODS AND APPARATUS FOR ANALYZING FLUTTER TEST DATA USING DAMPED SINE CURVE FITTING", both of which are incorporated herein by reference in their entireties.

According to one or more embodiments, a method is disclosed to break a very large nonlinear optimization problem into two parts. The first part focuses on the modal frequency, damping, and excitation level data. The second part focuses on the mode shape data.

According to one or more embodiments, the (second part) solution for the mode shape data may be further broken down into a separate problem for each sensor. As further described below, for these types of solutions for mode shape data, solving many small problems is much faster than solving one large problem. (i.e., it is more difficult and/or time-consuming to solve a problem for many sensors at once instead of solving a separate problem for each sensor).

According to one or more embodiments, the solution for the mode shape data at each sensor also can be formulated as a linear least squares problem (non-iterative closed form)

instead of a nonlinear optimization. Using the closed form linear least squares problem formulation for a given set of frequency, damping, and excitation level data, the optimal mode shape data can be determined more quickly compared to nonlinear optimization methods.

According to one or more embodiments, two examples of applications for these techniques are provided. The first is a mode shape expansion to determine the optimal mode shapes for a large set of sensors once the modal frequency, damping, and excitation level data has been determined from a small set of sensors. An example is given by method 500 (described below in connection with FIG. 5). The second is to incorporate the closed form mode shape fit into the nonlinear optimization for a large set (or any set) of sensors. An example for general non-linear optimization is given by method 400 (described below in connection with FIG. 4), and another example for determining the Jacobian matrix (generally applicable to non-linear optimization, among other things) is given by method 600 (described below in connection with FIG. 6).

FIG. 1 illustrates a system 100 for system identification, in accordance with one embodiment. In the example illustrated by system 100, the structure 102 subjected to flutter testing may be an aircraft, as shown, or may be another structural system subject to induced vibrations and oscillations. Structure 102 may be fitted with a set of sensors 104, which for the purposes of the equations that follow may be indexed by the variable "j" so that a particular, but non-specific, sensor of the set of sensors 104 may be referred to as sensor (j) or sensor j. Sensors 104 may include various types of sensors, such as accelerometers, strain gauges, flow velocity sensors, and temperature sensors, for example. Each sensor may provide a type of data to which it is designed to respond (e.g., acceleration, strain, flow velocity, temperature), and the data may be associated with a historical time at which the data is reported or measured.

Testing of structure 102 may include providing structure 102 (e.g., aircraft 102) with a group of excitations (not shown). For example, in the case of an aircraft, an excitation event may be provided by moving one or more control surfaces of the aircraft, adjusting power output level (e.g., throttle), or combining excitations. The excitation events may be provided in such a way as to elicit an impulse response from structure 102. Excitation events may be provided to which various sensors of the set of sensors 104 may be responsive and provide sensor data (e.g., measured data) in the form of sensor (j) response and time pairs, with historical time being indexed by the variable "p", with p starting at the value 1, for example, and each historical time point p that is kept track of in the data denoted by "$t_p$". Each excitation event, for the purposes of the equations that follow, may indexed by the variable "k" so that a particular, but non-specific, excitation event of the group of excitations may be referred to as excitation event (k). A sensor (j) response and time pair, at time point p, given an excitation event (k) (e.g., measured data or sensor data) may be denoted as $Y_{j,k}(t_p)$.

System 100 for system identification may include a computer system 108 for receiving the measured and timed sensor data. For example, computer system 108 may receive sensor data via telemetry 105. In an alternative embodiment, computer system 108 may receive sensor data via a recording of data. For example, data may be recorded in flight by apparatus on the aircraft 102. The recording apparatus may provide in-flight recorded data 106 that is transferred (as indicated by data transfer 107) to computer system 108. Data transfer 107 may comprise, for example, wired or wireless communication or reading of data from a computer readable medium, such as a magnetic, electrical, or optical medium.

Computer 108, having received the sensor data $Y_{j,k}(t_p)$ may be used to process the sensor data in a number of different ways. The processing may have application to, but is not limited to, flutter test data. For example, identification of a dynamic system can be made using nonlinear optimization to fit values $\hat{Y}_{j,k}(t_p)$ for a series of damped sine waves to test data (e.g., measured data or sensor response data $Y_{j,k}(t_p)$). The governing least squares optimization equation is given as follows:

$$\text{Minimize} \sum_{k=1}^{N_k} \sum_{j=1}^{N_j} \sum_{p=1}^{N_p} \left( \frac{\hat{Y}_{j,k}(t_p) - Y_{j,k}(t_p)}{Rng_{j,k}} \right)^2 \tag{0}$$

where:
$N_k$=number of excitation events;
$N_j$=number of response sensors;
$N_p$=number of time points;
k=index for the excitation events;
j=index for the set of sensors;
p=index for the time points;
$t_p$=one of the series of time points for which data has been taken;
$Rng_{j,k}$=normalization factor for a response from sensor (j) given an excitation event (k);
$Y_{j,k}(t_p)$=measured data for a response sensor (j) given an excitation event (k) at a particular time point (p); and
$\hat{Y}_{j,k}(t_p)$=fit equation for a response sensor (j) given an excitation event (k) at a particular time point (p).

This optimization seeks to determine the coefficients $W_i$, $D_i$, $A_{i,j}^O$, $\Phi_{i,j}^O$, e.g., mode (i) frequency and damping and mode shape information for each sensor (j), for the fit equation—equation (1)—given below. The fit equation provides for each $\hat{Y}_{j,k}(t_p)$ to be made up of a constant term $(C_{j,k})$ plus a series of damped sine waves. The first time point, $t_1$, may be treated as zero. The sine wave amplitude, A, and phase, $\Phi$, terms may be separated into excitation levels (superscript E) and output mode (superscript O) shapes. The fit equation is given as follows:

$$\hat{Y}_{j,k}(t_p) = C_{j,k} + \sum_{i=1}^{N} e^{-D_i(t_p-t_1)} A_{i,j}^O A_{i,k}^E \sin(W_i(t_p - t_1) + \Phi_{i,j}^O + \Phi_{i,k}^E) \tag{1}$$

where:
$C_{j,k}$=constant term, non-sinusoidal, for a response from sensor (j) given an excitation event (k);
N=number of modes;
i=index for the modes (e.g., mode (1) ... mode (i) ... mode (N));
$t_p$=one of the series of time points for which data has been taken;
$t_1$=first time point of the series of time points for which data has been taken;
$D_i$, $W_i$=damping and frequency terms for one of the modes, mode (i); the damping ratio is computed as $$\xi_i = \frac{D_i}{\sqrt{W_i^2 + D_i^2}};$$

$A_{i,k}^E$, $\Phi_{i,k}^E$=excitation level amplitude and phase for one of the modes (i) and one excitation event (k), the excitation level is fixed for the first excitation, k=1, so that $A_{i,1}^E$=1.0 and $\Phi_{i,1}^E$=0.0 for each mode (i); and $A_{i,j}^O$, $\Phi_{i,j}^O$=mode shape amplitude and phase (output) for one of the modes (i) at one response sensor (j).

FIG. 2 is a matrix sparsity diagram for a matrix 200, which can be used for solving a set of equations, using a nonlinear optimization, described by fit equation (1). Such a solution may provide optimal, or best fit to within the numerical accuracy of the computation, values for the terms of equation (1), namely $D_i$, $W_i$, $A_{i,k}^E$, $\Phi_{i,k}^E$ (terms that require non-linear optimization), and $C_{j,k}$, $A_{i,j}^O$, $\Phi_{i,j}^O$ (terms that can be determined by the closed form shape fit). The final result is an optimization for all of these terms. The nonlinear optimization procedures require the sensitivities (partial derivatives) of the fit for each term. Thus matrix 200 may be described, in mathematical terms, as the matrix of partial differentials often referred to as the Jacobian matrix. The matrix sparsity diagram for matrix 200 illustrates with an "x" the non-zero ("non-zero" refers to an entry which can take any value of the real number system, including zero—as distinguished from a zero entry, which can only be zero) entries and leaves blank the zero entries of matrix 200 used for solving equation (1), which is actually a set of equations indexed by j (for sensors), k (for excitation events), and i (for modes), with p (for time points). The example of matrix 200 is given for a fit equation with 2 excitations (k=1, 2), 3 sensors (j=1, 2, or 3) and 2 modes (i=1, 2).

As shown in FIG. 2, various blocks (e.g., blocks 202, 203) contain entries which are all zero. The blocks with non-zero entries (marked by x's, e.g., block 201) can be relatively few compared to the zero blocks, which may be described as matrix 200 being "sparse". The blocks with non-zero entries (generally located along a diagonal of matrix 200 and which lead to matrix 200 being referred to as being in block diagonal form) indicate which terms in the Jacobian matrix 200 are non-zero, which, in turn can indicate which fit equation terms ($D_i$, $W_i$, $A_{i,k}^E$, $\Phi_{i,k}^E$, $C_{j,k}$, $A_{j,k}^O$, $\Phi_{i,k}^O$, as indicated along the top of matrix 200 in FIG. 2) are affected by which measured data values ($Y_{j,k}(t_p)$, as indicated along the left side of matrix 200 in FIG. 2). It is notable that because $A_{i,1}^E$=1.0 and $\Phi_{i,1}^E$=0.0 for i=1, 2, these terms are defined as constants that need not be solved for and, thus, are not listed along the top of matrix 200.

So for the particular example illustrated by FIG. 2, block 201 of FIG. 2 shows that the sensor 1 terms are affected by the sensor 1 data. Blocks 202 show that the sensor 2 and sensor 3 terms are independent of (not affected by) the sensor 1 data. And, blocks 203 show that the sensor 1 terms are independent of (not affected by) the sensor 2 and sensor 3 data. Thus, the block diagonal form of matrix 200 can lead to simplifications in solving the equations for a linear least squares fit.

The fit equation terms have been arranged in FIG. 2 so that the frequency and damping ($W_i$, $D_i$) and excitation amplitude and phase ($A_{i,k}^E$, $\Phi_{i,k}^E$) terms are gathered together. Then the constant and mode shape amplitude and phase ($C_{j,k}$, $A_{i,j}^O$, $\Phi_{i,j}^O$) terms are gathered together for each sensor, as indicated along the top of matrix 200 in FIG. 2. The arrangement gives rise to a block diagonal form of matrix 200 for the sensor (j) terms. Using this block diagonal form of matrix 200, it can easily be seen that once the frequency and damping and excitation amplitude and phase terms have been determined, then the optimization problem can be broken into separate problems for each sensor (j) using only the measured data for that sensor, which may include data for each excitation for that sensor (e.g., $Y_{1,1}$; $Y_{1,2}$ for sensor (1)).

Figure 3:
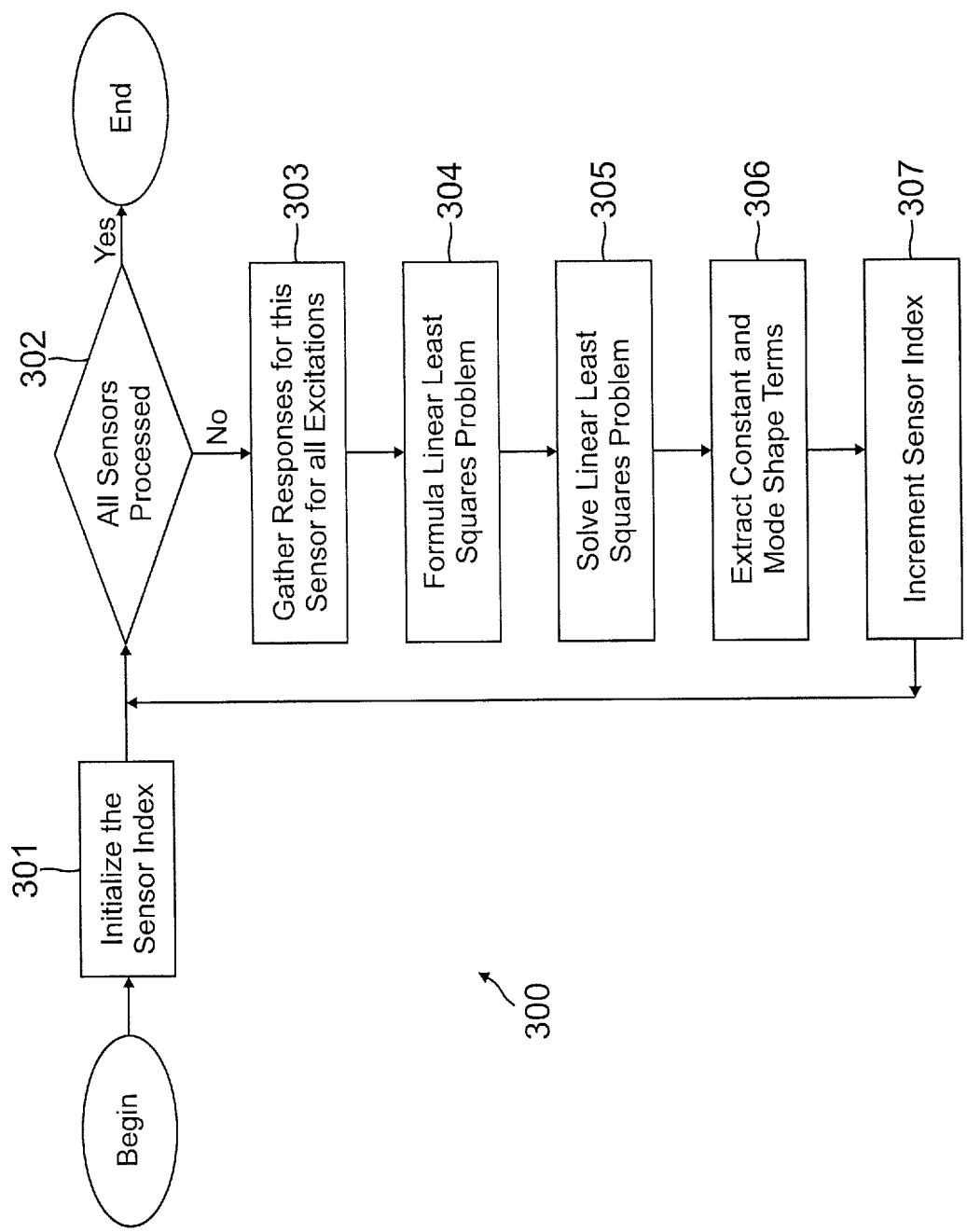
FIG. 3 is a flow diagram illustrating a method for processing a closed form shape fit, according to an embodiment.

Thus, FIG. 2 illustrates the relative independence, as between different sensors (j), for processing the closed form shape fit (as illustrated by FIG. 3) for each sensor (j) (e.g., of the set of sensors 104), according to one embodiment. Thus, using the block diagonal form illustrated by FIG. 2, it becomes possible to break down the overall problem of solving the fit equation into smaller sub-problems, one sub-problem for each sensor (j). Each sub-problem can be processed (that part of the fit equation (1) solved) in short amount of time such that the total amount of time for solving all the sub-problems is significantly less than for solving the fit equation (1) as whole without breaking into sub-problems for each sensor.

FIG. 3 illustrates a method 300 for processing a closed form shape fit, according to an embodiment. As indicated in FIG. 3, processing for a method 300 may begin and proceed to a sub-process 301 of initializing the sensor index j. For simplicity in illustrating the example of FIG. 3, index j may be assumed to be initialized to 1 and to be incremented by method 300 (e.g., at sub-process 307) so as to run from 1 to $N_j$ counting by 1 such that when j reaches the value $N_j$, method 300 may determine at sub-process 302 that data for all of the sensors (j) have been processed and "end" processing for method 300, as indicated in FIG. 3. One example of processing the set of sensors 104 may be illustrated by FIG. 3, but, depending on various considerations, such as wishing to process a particular subset of the set of sensors 104, index j may be initialized to any desired value and incremented or stepped through in any desired fashion, and the correspondence of index j to the actual sensors 104 may vary as defined by the user of method 300.

Method 300 may continue at sub-process 303 by gathering data for sensor (j) for all excitation events (k). For the example of FIG. 2, with j=1 (e.g., sensor 1 data), the data $Y_{1,1}$; $Y_{1,2}$ for sensor 1 (first index=1) and excitation events 1 and 2 (second index=1 or 2), may be gathered, e.g., placed in a particular accessible location of a computer memory of computer system 108 for processing by a computer processor of computer system 108. The data $Y_{1,1}$; $Y_{1,2}$ may include the data $Y_{j,k}(t_p)$ for j=1, k=1 or 2, and for all time points $t_p$ for which data has been collected, for example—or the data by time points may be restricted as desired to a chosen subset of time points $t_p$. For example, data might be included only for a smaller sample rate than that for which data was taken, e.g., use only data for every third time point. For example, data commonly may be taken at a sample rate of 1,000 data points per second but, for lower frequency modes, used at only 500 samples per second (use, e.g., only every other data point). This reduction of data rate, often called data decimation, can speed up the processing without any significant or undesired loss of accuracy. Key to the choice of how much to reduce the data rate is the number of data points per cycle. For example, for a 20 Hz (Hertz) mode with 500 data points per second, there will be 25 data points per cycle, which is usually considered adequate for the typically desired accuracy.

Method 300 may continue at sub-process 304 by formulating a linear least squares problem for solving the fit equation (1) for sensor (j) for all excitation events (k). For the example of FIG. 2, solving the fit equation for sensor (j) for all excitation events (k) corresponds to solving a small set (less than the entire set described by equation (1)) of equations corresponding to one of the non-zero blocks on the diagonal of matrix 200. For the example of FIG. 2, with j=1 (e.g., sensor 1 data), the set of fit equations will correspond to block 201, the set of fit equations for sensor 2 will correspond to the second non-zero block on the diagonal of matrix 200, and so on. Thus, for our example of FIG. 2, for sub-process 304 to formulate the linear least squares problem for solving the fit equation (1) for sensor 1, all excitations, and all modes means that equation (1) is formulated with j=1, k=1 or 2, and i=1 or 2. With the frequency (W), damping (D), excitation amplitude ($A^E$), and excitation phase ($\Phi^E$) terms being determined (e.g., the known terms) and a sensor being chosen (j=1, for our example), the trigonometric identity sin(A+B)=sin (A) cos (B)+cos (A) sin (B) can be used to write equation (1) in the following form:

$$\hat{Y}_{j,k}(t_p) = C_{j,k} + \sum_{i=1}^{N} \begin{bmatrix} A_{i,j}^O \cos(\Phi_{i,j}^O) e^{-D_i(t_p-t_1)} A_{i,k}^E \sin(W_i(t_p-t_1)+\Phi_{i,k}^E) + \\ A_{i,j}^O \sin(\Phi_{i,j}^O) e^{-D_i(t_p-t_1)} A_{i,k}^E \cos(W_i(t_p-t_1)+\Phi_{i,k}^E) \end{bmatrix} \quad (2)$$

Equation (2) can be written in a simpler form by performing, at sub-process 304, the following variable substitutions (3) for the mode shape amplitudes ($A^O$) and phases ($\Phi^O$) (e.g., the unknown terms) and for the excitation amplitudes ($A^E$) and phases ($\Phi^E$) (e.g., the known terms), defining new variables $A^S$ and $A^C$ for the mode shape terms (unknowns), and new variables $X^S$ and $X^C$ for the excitation terms (knowns), as follows:

$$A_{i,j}^S = A_{i,j}^O \cos(\Phi_{i,j}^O);$$

$$A_{i,j}^C = A_{i,j}^O \sin(\Phi_{i,j}^O);$$

$$X_{i,k}^S(t_p) = e^{-D_i(t_p-t_1)} A_{i,k}^E \sin(t_p-t_1)+\Phi_{i,k}^E);$$

$$X_{i,k}^C(t_p) = e^{-D_i(t_p-t_1)} A_{i,k}^E \cos(W_i(t_p-t_1)+\Phi_{i,k}^E) \quad (3).$$

Using the substitutions (3), equation (2) becomes:

$$\hat{Y}_{j,k}(t_p) = C_{j,k} + \sum_{i=1}^{N} [A_{i,j}^S X_{i,k}^S(t_p) + A_{i,j}^C X_{i,k}^C(t_p)]. \quad (4)$$

Equation (4) is a simple linear equation for which a least squares closed-form optimization can be performed to find optimal values for the unknowns (the $A^S$ and $A^C$ mode shape terms). Thus, by providing equation (4), sub-process 304 formulates a linear least squares problem for solving, in closed form, the fit equation (1) for the particular sensor j, for all excitation events (k).

Because equation (4) can be solved directly, using strictly algebraic techniques, for the constants and mode shape terms (C, $A^S$, and $A^C$ terms), equation (4) is referred to as being in closed form. With a closed-form shape fit, a deterministic or simple algebraic solution may be provided for equation (4) that, for example, does not rely on approximation (such as a Gauss-Newton method) or other techniques using calculus.

Method 300 may continue at sub-process 305, by providing a solution to the closed-form shape fit problem formulated at sub-process 304. Recalling that a particular sensor j has been chosen so that j is fixed, equation (4), can be formulated as a system of $N_k \cdot N_p$ linear equations (indexed by k for all time points indexed by p) in $N_k+2N$ variables ($A_{i,j}^S$, $A_{i,j}^C$ indexed by i with $N_k$ constants ($C_{j,k}$)). The equation can be written in matrix form, for example, as XA=Y, where X is an $N_k \cdot N_p$ by ($N_k+2N$) augmented matrix of the knowns; A is an ($N_k+2N$) by 1 column vector of the unknowns; and Y is an ($N_k \cdot N_p$) by 1 column vector of the $Y_{j,k}(t_p)$ data values. The matrix X and column vector Y may be normalized by the $Rng_{j,k}$ normalization factors described above. Then, for example, the equation XA=Y may be solved for A as A=$[X^T X]^{-1}[X^T Y]$ using one technique. Other techniques, such as Gaussian elimination, also may be used. Thus, sub-process 305 may provide a linear least squares solution for the fit equation (4) for sensor (j) for all excitation events (k).

In the example illustrated by FIG. 2—where the example of matrix 200 is given for a fit equation with $N_k=2$ excitations (k=1, 2), $N_j=3$ sensors (j=1, 2, or 3) and N=2 modes (i=1, 2) with p=1 . . . $N_p$—solving for each sensor j presents a problem with $N_k \cdot N_p = 2 N_p$ linear equations in $N_k+2N=2+2 \cdot 2=6$ variables, or $2N_p \times 6$. With 3 sensors and using the closed form shape fit to solve each sensor separately, there are 3 $2N_p \times 6$ problems. With 3 sensors, and solving for all of the sensors concurrently there is one $6N_p \times 18$ problem. Typically, the one large problem (e.g., $6N_p \times 18$ in this example) requires far more computer time than the multiple smaller problems (e.g., 3 $2N_p \times 6$ problems in this example). Thus, use of method 300 may provide significant gains in computing efficiency for solving the fit equation (1) for optimization and system identification.

Method 300 may continue at sub-process 306, by extracting the constant and mode shape terms of equation (2) (which are the same as for equation (1)) from the solutions for equation (4) given by sub-process 305. Thus, sub-process 306 may provide a solution to the closed-form shape fit problem expressed in the original variables used in equation (2). Sub-process 306 may "reverse" or invert the variable substitutions (3) of the new variables $A^S$ and $A^C$ to "recover" the mode shape amplitudes ($A^O$) and phases ($\Phi^O$), as follows:

$$A_{i,j}^O = \sqrt{A_{i,j}^S A_{i,j}^S + A_{i,j}^C A_{i,j}^C}; \Phi_{i,j}^O = \arctan(A_{i,j}^C / A_{i,j}^S) \quad (5).$$

It may be noted that many commercial mathematics packages, such as MATLAB®, provide an atan 2 function, which may be applied to equation (5) as:

$\Phi_{i,j}^O$=atan 2($A_{i,j}^C$, $A_{i,j}^S$) to provide the required four quadrant phase information.

Thus, sub-process 306, may provide a linear least squares solution for the fit equation (1) for sensor (j) for all excitation events (k), referred to as closed form shape fit for sensor j.

Method 300 may continue at sub-process 307, by incrementing the sensor index j. As described above with regard to sub-process 302, any subset of the sensors may be processed in any order, and stepping through the sensors one-by-one, from 1 to $N_j$, according to the index j and as the sensors may be numbered is just one example. Any particular set of sensors may be chosen (e.g., any one, any two, etc., or all) and processed sensor by sensor in any desired order, according to modifications made to sub-processes 302 and 307.

Figure 4:
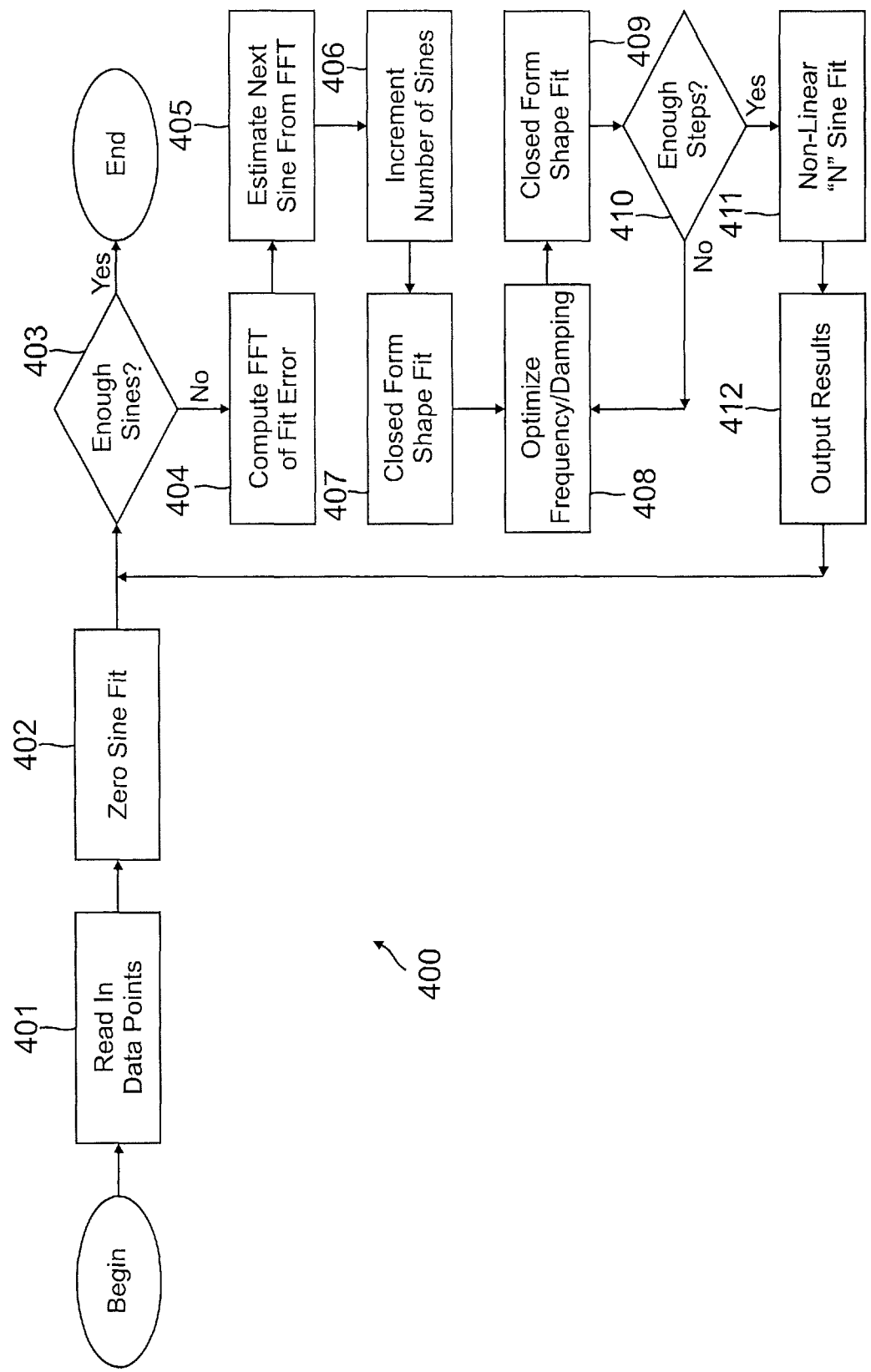
FIG. 4 is a flow diagram illustrating a method for incorporating the closed form shape fit into a nonlinear fit, according to an embodiment.

FIG. 4 illustrates a method 400 for incorporating the closed form shape fit of method 300 into a nonlinear fit of flutter test data (e.g., flight test data provided by system 100 from sensors 104 to computer system 108) using a series of one or more damped sine waves, according to one embodiment. Method 400 may, at step 401, read in a set of data points $Y_{j,k}(t_p)$ for a flutter time history data set by, for example, storing the set of data points in a storage device or computer readable memory of computer system 108.

Method 400 may then continue at step 402, performing a nonlinear zero sine fit to the data set $Y_{j,k}(t_p)$ with zero sines, thus only including the constant terms in equation (1) to determine the fit values $\hat{Y}_{j,k}(t_p)$.

At decision block 403, a determination may be made whether the curve-fitting process is complete, e.g., whether enough sine terms have been included in the fit to meet some pre-specified criterion. The fit process may be complete when one of the damped sine waves in the fit is unstable. Typically, all of the sine waves in the fit should be stable. The amplitude of each sine wave should be a significant portion of the total. Generally, the amplitude of each sine wave should be larger than the fit error. If the method 400 is not complete, a fit error may be determined, for example, by evaluating the expression given in "equation" (0).

At step 404, a Fast-Fourier Transform (FFT) function may be applied to the fit error. At step 405, a next damped sine mode may be estimated from the FFT function. More specifically, the frequency and phase of the next damped sine wave may be taken from the largest peak in the FFT. In one embodiment, the half-power method may be used to estimate the damping, and the amplitude may be initially set to zero. Using zero for the initial value for the amplitude may help to ensure that the fit will not be degraded with the addition of the next sine wave. At step 406, the number of damped sine modes in the curve fit may be incremented.

At step 407, method 300 may be applied to the current values, using the current number of sines in the fit, of the "knowns" in equation (1), the frequency (W) and damping (D) and excitation amplitude ($A^E$) and phase ($\Phi^E$), to provide a solution for the "unknowns", the constant (C) and mode shape amplitude($A^O$) and phase)($\Phi^O$) terms.

At step 408, a non-linear optimization can be performed, using the results of step 407, to determine new values for the frequency (W) and damping (D) and excitation amplitude ($A^E$) and excitation phase ($\Phi^E$) terms.

At step 409, method 300 may be applied to the current values, using the current number of sines in the fit, of the "knowns" in equation (1), the new frequency (W) and damping (D) and new excitation amplitude ($A^E$) and phase ($\Phi^E$), to provide a revised solution for the "unknowns", the constant (C) and mode shape amplitude)($A^O$) and phase) ($\Phi^O$) terms. At decision block 410, if enough steps have been performed (e.g., iterations of steps 408 and 409, which may be a selected number of steps that is, for example, either predetermined or convergence based, e.g., the revised solutions are converging) to provide adequately improved values for the constant (C) and mode shape amplitude)($A^O$) and phase ($\Phi^O$) terms in equation (1), method 400 may continue at step 411. Otherwise a further iteration of steps 408, 409, and decision block 410 may be performed.

At step 411, a nonlinear "N" damped sine fit (where "N" is the current number of sines in the fit) may be applied to the flutter test data set $Y_{j,k}(t_p)$. It is during the nonlinear "N" damped sine fitting procedure that the frequency and damping and mode shape characteristics for all measurable structural modes may be determined from the test data. At step 412, method 400 may output results, e.g., by printing the results, displaying the results on a monitor, or by writing the results to a data file. Method 400 may then continue at decision block 403, where a determination may be made whether the curve-fitting process is complete.

Method 400 may obtain the same results for frequency, damping, and mode shape as previously accomplished using a nonlinear "N" damped sine fit without steps 407, 408, 409 and 410, but in much less time, e.g., computation operations or computer time. For example, in one case of flutter test data from 70 sensors, the speed up was 36:1 for a 2-sine fit and 60:1 for a 4-sine fit. The closed form shape fit (method 300) may be used with a particular version of the nonlinear optimization that optimizes on only the frequency, damping, and excitation level (e.g., step 408, Optimize Frequency/Damping). These two optimizations may be done for a selected number of steps (predetermined or convergence based).

Figure 5:
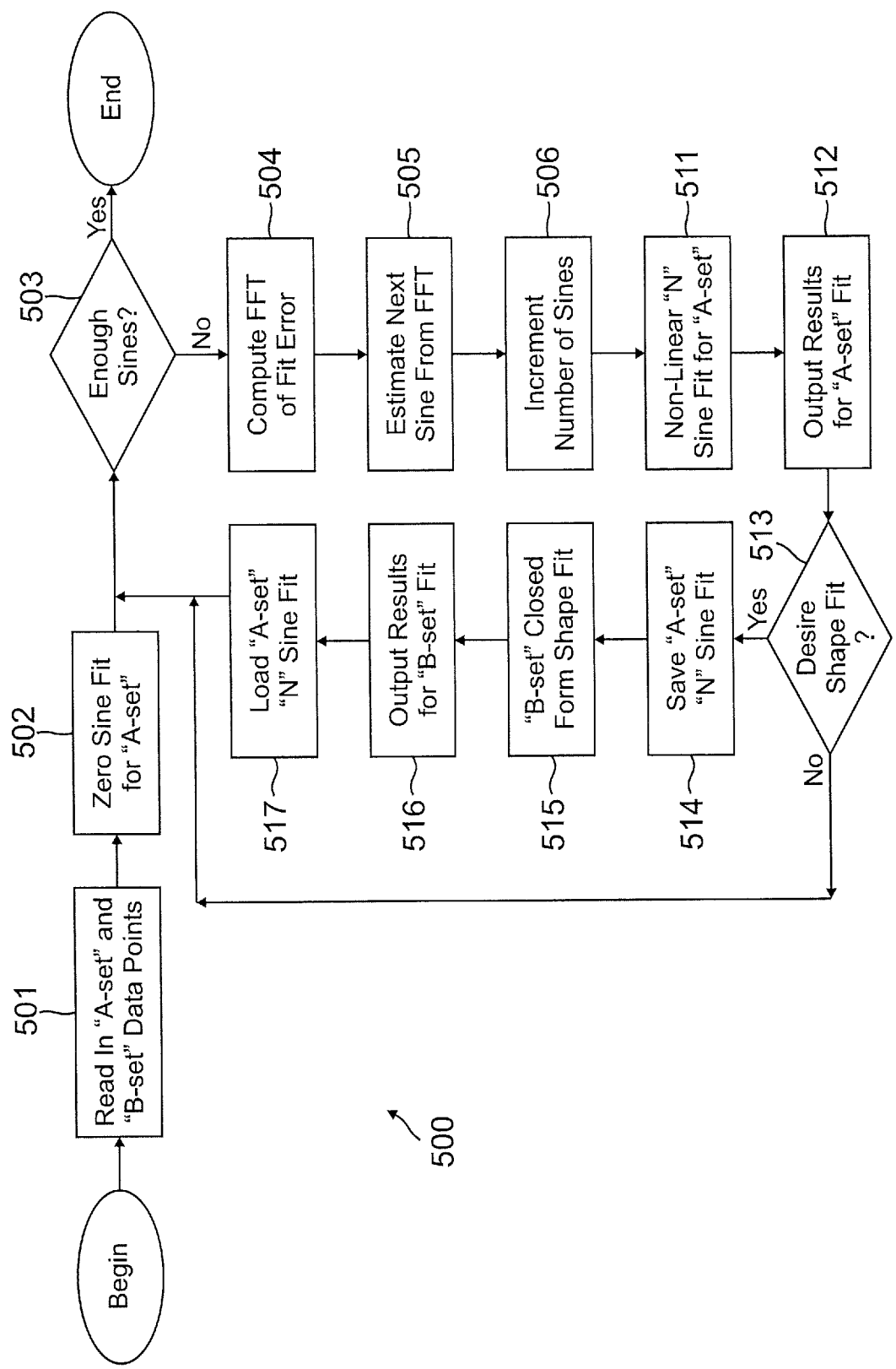
FIG. 5 is a flow diagram illustrating a method for obtaining mode shapes for a very large set of sensors once key parameters have been determined using a small set of sensors, according to an embodiment.

FIG. 5 illustrates a method 500 for obtaining mode shapes for a very large set of sensors (data set B) once key parameters have been determined using a small set of sensors (data set A), according to one embodiment. Method 500 may provide a means, using method 300, to compute the mode shapes for a very large set (B) of sensors once the modal frequency and damping (and excitation amplitude and phase) data have been determined using a small set (A) of sensors. These mode shapes take much less time to obtain than a "standard" fit of the large set of sensors. For one sample case, the speed up for a 2-sine fit expanding from 7 sensors to 70 was 360:1 compared to performing the "standard" fit on the set of 70 sensors, even though the frequency and damping were still obtained from only the small set of sensors, which is not the same as the standard fit using the larger set of sensors. One purpose of method 500 may be to get the best possible mode shapes given the frequency, damping, and excitation level data obtained from the standard fit of the small set of sensors.

Method 500 may, at step 501, read in a set of data points $Y_{j,k}(t_p)$ for a flutter time history data set by, for example, storing the set of data points in a storage device or computer readable memory of computer system 108. The flutter time history data set may include both a smaller set, A, of data (e.g., from a restricted set of sensors 104) and a larger set, B, of data (e.g., from the set of all sensors 104).

Method 500 may then continue at step 502, performing a nonlinear zero sine fit to the A data set of $Y_{j,k}(t_p)$ values with zero sines, thus only including the constant terms in equation (1) to determine the fit values $\hat{Y}_{j,k}(t_p)$ for the A data set.

At decision block 503, a determination may be made whether the curve-fitting process is complete, e.g., whether enough sine terms have been included in the fit to meet some pre-specified criterion. The fit process may be complete when one of the damped sine waves in the fit is unstable. Typically, all of the sine waves in the fit should be stable. The amplitude of each sine wave should be a significant portion of the total. Generally, the amplitude of each sine wave should be larger than the fit error. If the method 500 is not complete, a fit error may be determined, for example, by evaluating the expression given in "equation" (0).

At step 504, a Fast-Fourier Transform (FFT) function may be applied to the fit error. At step 505, a next damped sine mode may be estimated from the FFT function. More specifically, the frequency and phase of the next damped sine wave may be taken from the largest peak in the FFT. In one embodiment, the half-power method may be used to estimate the damping, and the amplitude may be initially set to zero. Using zero for the initial value for the amplitude may help to ensure that the fit will not be degraded with the addition of the next sine wave. At step 506, the number of damped sine modes in the curve fit may be incremented.

At step 511, a nonlinear "N" (where "N" is the current number of sines in the fit) damped sine fit may be applied to the flutter test data for data set A. It is during the nonlinear "N" damped sine fitting procedure that the frequency and damping and mode shape characteristics for all measurable structural modes may be determined from the test data. Step 511, may, for example, apply the techniques of method 400, such as performing step 407, closed form shape fit, step 408, optimize frequency damping, step 409, perform closed form shape fit, and step 410, iterate steps 408, 409 until enough steps have been performed based on a selected number of steps—e.g., predetermined or convergence based.

At step 512, method 500 may output results for the fit to data set A, e.g., by printing the results, displaying the results on a monitor, or by writing the results to a data file. Method 500 may then continue at decision block 513, where a determination may be made whether a shape fit for data set B is desired (yes, proceed to step 514; no, proceed to decision block 503).

At step 514, method 500 may save the nonlinear "N" damped sine fit results from from step 512 to a data storage device of, for example, computer system 108, or a computer readable medium accessible by computer system 108. At step 515, method 500 may use the results, such as the frequency and damping ($W_i$, $D_i$) terms and excitation amplitude and phase ($A_{i,k}^E$, $\Phi_{i,k}^E$) terms for data set A stored at step 514 to perform a "closed form shape fit", using method 300, for data set B to determine the constant and mode shape amplitude and phase ($C_{j,k}$, $A_{i,j}^O$, $\Phi_{i,j}^O$) terms. At step 516, method 500 may output results of the closed form shape fit for data set B, e.g., by printing the results, displaying the results on a monitor, or by writing the results to a data file. Method 500 may then, at step 517, load the "N" sine fit results and data for data set A (for example, as saved at step 514) for possible further iteration of steps 504-517 and continue at decision block 503, where a determination may be made whether the curve-fitting process for the B data set is complete.

Figure 6:
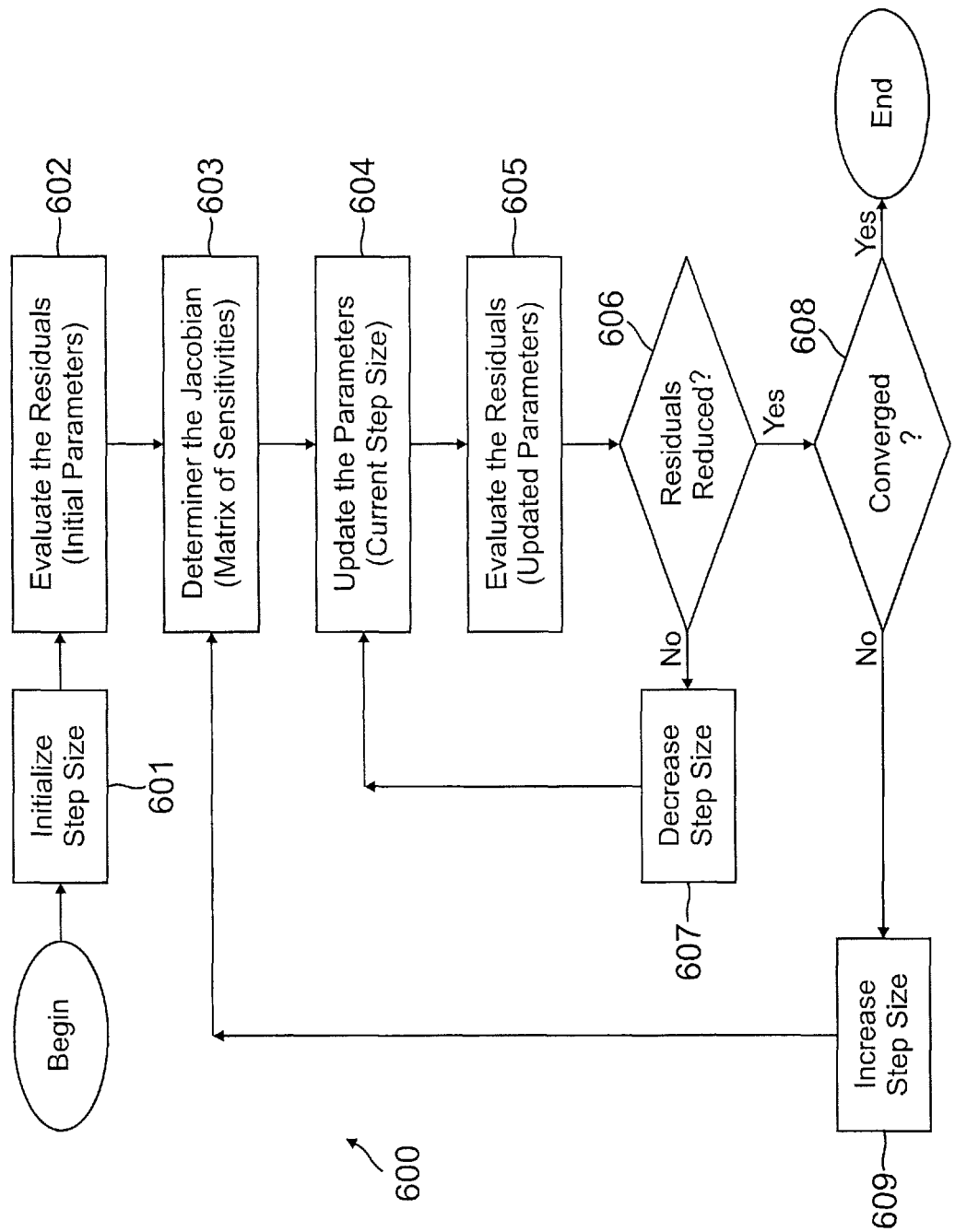
FIG. 6 is a flow diagram illustrating a method for nonlinear optimization to which the closed form shape fit has been applied to speed up the nonlinear optimization process, in accordance with one or more embodiments.

FIG. 6 illustrates a method 600 for nonlinear optimization to which the closed form shape fit has been applied to speed up the nonlinear optimization process, in accordance with one or more embodiments.

Method 600 provides an example of using the closed form shape fit (e.g., method 300) to imbed this linear least squares solution into the non-linear optimization process, which, for most problem sizes, can greatly reduce the number of parameters in the non-linear optimization. For example, Table 1 illustrates that, as problem size grows, the number of parameters in the non-linear optimization can be made to grow slowly while the number of parameters in the closed form shape fit absorbs most of the growth in the number of parameters. The process illustrated by method 600 may optimize the modal frequency and damping, and the mode shapes may be treated as a function of the optimization parameters within the optimization process. Thus, method 600 may reduce the compute time for these optimizations because of the reduction in the number of parameters in the non-linear optimization.

The number of parameters in the fit equation is shown below. Also shown is the number of those parameters that require non-linear optimization and the number of those parameters that may be determined using the closed form shape fit (e.g., method 300). The parameters that require nonlinear optimization are the frequency and damping for each mode, and the excitation amplitude and phase for each excitation (except the first one; recall that $A_{i,1}^E=1.0$ and $\Phi_{i,1}^E=0.0$ for each mode (i)). The parameters that can be determined using the closed form shape fit are the offset values for each sensor at each excitation, and the output mode shape amplitude and phase for each mode for each sensor. Table 1 provides an example of sample problem sizes, where:

N=number of modes;
$N_K$=number of excitation events;
$N_J$=number of response sensors for each excitation event;

$Nparm$ = number of all parameters in the fit equation;
 $= 2N + 2N(N_K - 1) + N_K \cdot N_J + 2N \cdot N_J$;

$Nparm1$ = number of paramters requiring non-linear optimization;
 $= 2N + 2N(N_K - 1)$;

$Nparm2$ = number of parameters determined by closed form shape fit;
 $= N_K \cdot N_J + 2N \cdot N_J$.

TABLE 1

| N | $N_K$ | $N_J$ | Nparm | Nparm1 | Nparm2 |
|---|---|---|---|---|---|
| 3 | 1 | 12 | 90 | 6 | 84 |
| 4 | 1 | 12 | 116 | 8 | 108 |
| 3 | 2 | 12 | 108 | 12 | 96 |
| 4 | 2 | 12 | 136 | 16 | 120 |
| 3 | 1 | 70 | 496 | 6 | 490 |
| 4 | 1 | 70 | 638 | 8 | 630 |
| 3 | 2 | 70 | 572 | 12 | 560 |
| 4 | 2 | 70 | 716 | 16 | 700 |
| 3 | 1 | 136 | 958 | 6 | 952 |
| 4 | 1 | 136 | 1232 | 8 | 1224 |
| 3 | 2 | 136 | 1100 | 12 | 1088 |
| 4 | 2 | 136 | 1376 | 16 | 1360 |

The closed form shape fit linear least squares optimization (e.g., method 300) can be incorporated into practically any non-linear optimization process. Method 600 provides an example of a non-linear optimization process into which the closed form shape fit (e.g., method 300) may be incorporated, in accordance with one embodiment. More particularly, the closed form shape fit may be seen to be applied in method 600 at sub-process 602, "evaluate the residuals", sub-process 603, "determine the Jacobian", and sub-process 605, "evaluate the residuals".

Figure 7:
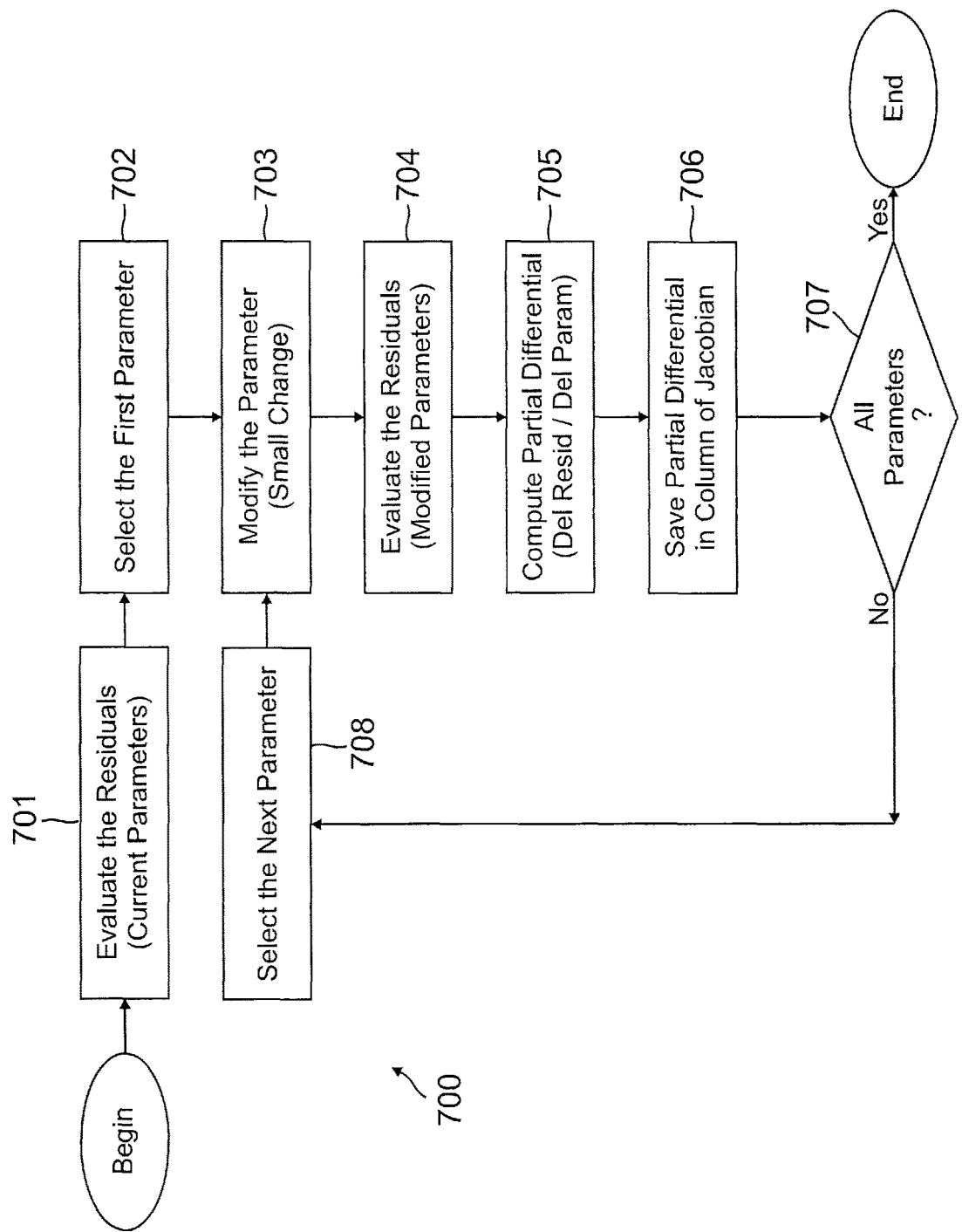
FIG. 7 is a flow diagram illustrating a method for determining the Jacobian, which may be applied in a method for nonlinear optimization such as illustrated in FIG. 6, in accordance with one embodiment.

At sub-process 601, method 600 may begin a process for non-linear optimization, such as a Levenberg-Marquardt method or other optimization search method, by initializing a step size. Such a step size may typically be referred to with the symbol δ, for example, in a Levenberg-Marquardt process, and may be chosen according to the type of search or non-linear optimization being performed, the values of problem parameters and constraints, and other considerations. At sub-process 602, method 600 may continue by evaluating residuals for the initial parameters, into which the closed form shape fit (method 300) may be incorporated using method 800, shown in FIG. 8. Residuals may, for example, be evaluated as the deviations of fitted values from data values such as shown in "equation" (0). At sub-process 603, the Jacobian, or matrix of sensitivities, may be updated. The closed form shape fit (e.g., method 300) may be incorporated into sub-process 603, as illustrated by FIG. 7, and may improve the computational efficiency of the process. At sub-process 604, parameters of the non-linear optimization problem being solved by method 600 may be updated using the current step size, as determined either at sub-process 601, sub-process 607, or sub-process 609. At sub-process 605, the process for non-linear optimization of method 600 may continue by evaluating the residuals for the updated parameters, into which the closed form shape fit (method 300) may be incorporated using method 800, shown in FIG. 8. At decision block 606, if the residual have been reduced (a sum of the squares of the deviations of fitted values from data values is less than that previously calculated either at sub-process 605 or sub-process 602), method 600 may continue at decision block 608; otherwise method 600 may continue by decreasing the step size (e.g., δ) at sub-process 607 and proceed at sub-process 604, as shown in FIG. 6. At decision block 608, a test for convergence may be performed, and if the solutions are converging, it may be decided that process 600 has reached a solution for the non-linear optimization and terminate as shown in FIG. 6; otherwise method 600 may continue by increasing the step size (e.g., δ) at sub-process 609 and proceed at sub-process 603, as shown in FIG. 6.

Method 600 may obtain the same results for frequency, damping, and mode shape as previously accomplished using prior art nonlinear "N" damped sine fitting methods, but in much less time, e.g., computation operations or computer time. For example, in one case of flutter test data from 70 sensors, the speed up was 470:1 for a 4-sine fit and another case of flutter test data from 136 sensors, the speed up was 1020:1 for a 4-sine fit. (See, also, Table 1.)

FIG. 7 illustrates a method 700 for determining the Jacobian when the partial derivatives are to be estimated using differencing. Method 700 may be applied, for example, in a method for nonlinear optimization such as illustrated in FIG. 6, in accordance with one or more embodiments.

Method 700 may require a series of "evaluate the residuals" operations into which the closed form shape fit (e.g., method 300) may be incorporated, in accordance with one embodiment. More particularly, the closed form shape fit may be seen to be applied in method 700 at sub-processes 701 and 704 "evaluate the residuals" and may improve the computational efficiency of each sub-process and the process of method 700 as a whole.

At sub-process 701, method 700 may begin a process for determining a Jacobian matrix for solving an optimization problem. Sub-process 701 may evaluate the residuals (e.g., the deviations of fitted values from data values, such as shown in "equation" (0)) for a set of current parameter values. Sub-process 701 may incorporate method 800, shown in FIG. 8, which may incorporate the closed form shape fit (e.g., method 300).

At sub-process 702, method 700 may select a first parameter of some pre-specified set of parameters and proceed to sub-process 703. At sub-process 703, the parameter and only that parameter (e.g. the first parameter if coming from sub-process 702, the "next" parameter if coming from sub-process 708) may be modified by making a change ("Del Param" as shown in FIG. 7) to its original value at the beginning of method 700. The change may be considered small, for example, if the change is of the order of magnitude of the accuracy desired to be obtained for the overall solution of the optimization problem to which the Jacobian may be applied. At sub-process 704, the residuals may be evaluated using the modified parameters resulting from sub-process 703. Sub-process 704, like sub-process 701, may incorporate method 800, shown in FIG. 8, which may incorporate the closed form shape fit (e.g., method 300).

At process 705, one of the partial differentials for the Jacobian matrix may be computed using the difference between calculated residuals from the most recent sub-process 704 and from sub-process 701 (e.g., "Del Resid" as shown in FIG. 7) and using the size of the change to the parameter (e.g., "Del Param" as shown in FIG. 7) made at sub-process 703 to compute the ratio: "Del Resid/Del Param", as shown in FIG. 7.

At sub-process 706, the partial differential may be stored, for example, in a computer memory or storage device of computer system 108. At decision block 707, if the partial differentials have been evaluated for all parameters, method 700 may terminate, as indicated in FIG. 7, or may continue at sub-process 708 by selecting the next parameter and continuing at sub-process 703.

Figure 8:
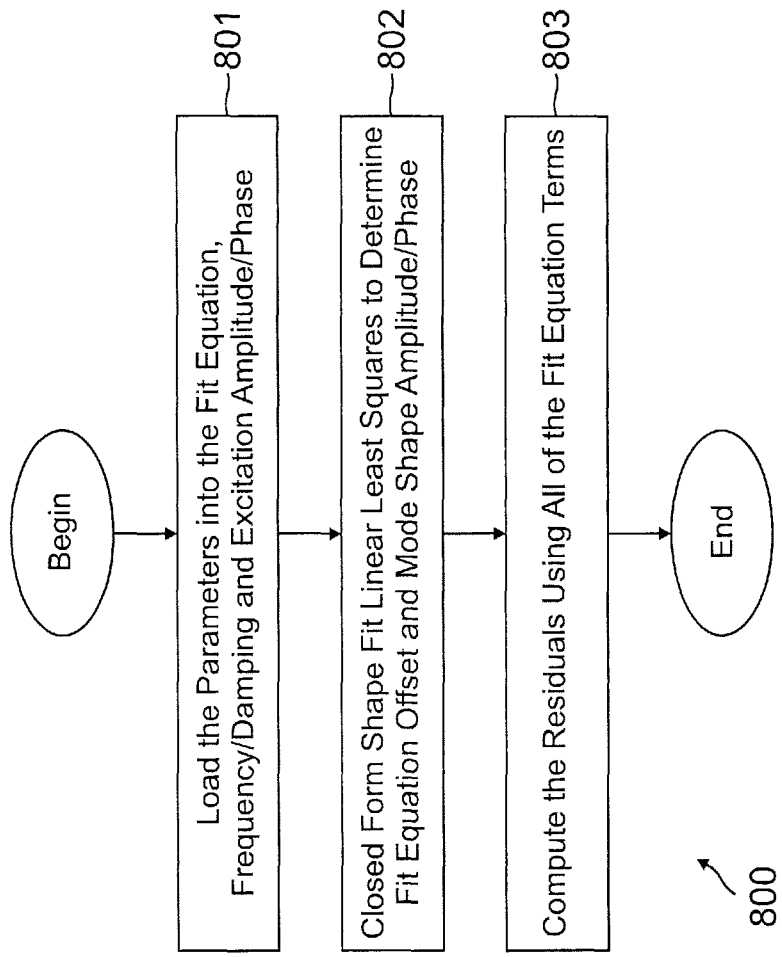
FIG. 8 is a flow diagram illustrating a method for evaluating the residuals, which may be applied in a method for nonlinear optimization such as illustrated in FIG. 6 and FIG. 7, in accordance with one embodiment.

FIG. 8 illustrates a method 800 for evaluating the residuals, in accordance with one or more embodiments. Method 800 may incorporate the closed form shape fit (e.g., method 300) at sub-process 802, and may improve the computational efficiency of the process of evaluating the residuals. Method 800 may be applied, for example, in a method for nonlinear optimization, such as method 600 illustrated in FIG. 6. Method 800 may be applied also, for example, in a method for determining a Jacobian matrix of sensitivities for solving optimization problems, such as illustrated by method 700 shown in FIG. 7.

At sub-process 801, method 800 may begin a process for evaluating the residuals (e.g., the deviations of fitted values from data values, such as shown in "equation" (0)) by loading parameters into the fit equation. In other words, values for the frequency and damping parameters and excitation amplitude and phase parameters for equation (1) may be stored for ready access in a memory or storage device of, for example, computer system 108, so that equation (1) maybe readily evaluated.

At sub-process 802, a closed form shape fit linear least squares process, such as method 300 may be performed to determine fit equation (equation (1)) offset (e.g., values of the constants $C_{j,k}$) and mode shape amplitude and phase (e.g., values of the $A_{i,j}$, $\Phi_{i,j}^{O}$) values. Using the closed form techniques of method 300, the solution for these values can be computed in less time (as illustrated by, e.g., Table 1) than by using prior art non-linear optimization for solving equation (1).

At sub-process 803, the residuals (e.g., the deviations of fitted values from data values for equation (1)) may be computed using all of the fit equation (equation (1)) terms (e.g., constants, frequency/damping, excitation, and mode shape terms).

Figure 9:
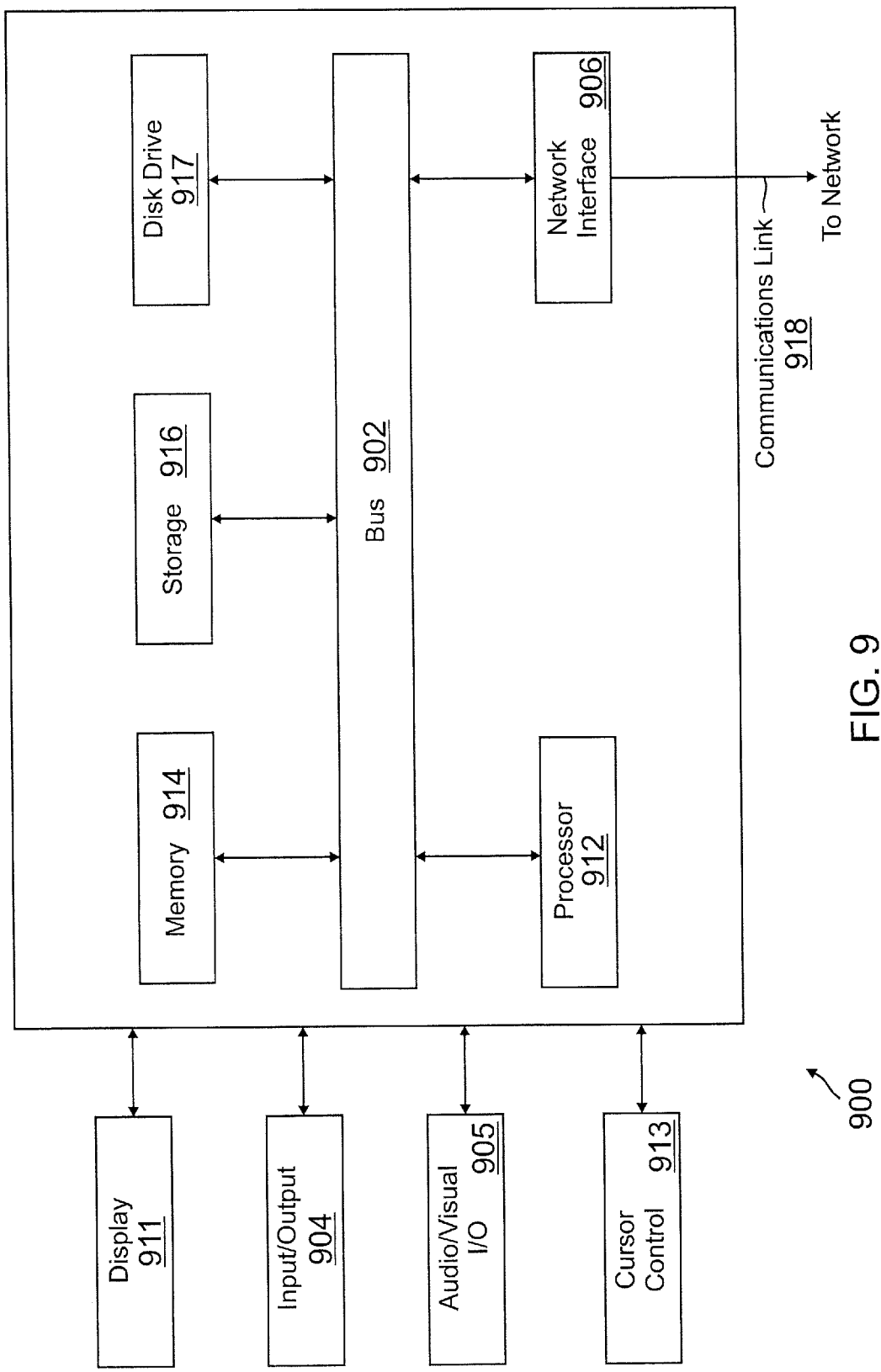
FIG. 9 is a block diagram of an example of a computer system suitable for implementing processing for a system for system identification, according to an embodiment.

FIG. 9 is a block diagram of an example of a computer system 900 suitable for implementing data analysis or other software processing, such as system identification or non-linear optimization processing, according to one or more embodiments. Computer system 900 may include a bus 902 or other communication mechanism for communicating information data, signals, and information between various components of computer system 900. Components include an input/output (I/O) component 904 that processes a user action, such as selecting keys from a keypad/keyboard, selecting one or more buttons or links, etc., and sends a corresponding signal to bus 902. I/O component 904 may also include an output component, such as a display 911 and a cursor control 913 (such as a keyboard, keypad, mouse, etc.). An optional audio input/output component 905 may also be included to allow a user to use voice for inputting information by converting audio signals. Audio I/O component 905 may allow the user to hear audio. A transceiver or network interface 906 transmits and receives signals between computer system 900 and other devices, such as photogrammetry system 106 or physical support system 104. In one embodiment, the transmission is wireless, although other transmission mediums and methods may also be suitable. A processor 912, which can be a micro-controller, digital signal processor (DSP), or other processing component, processes these various signals, such as for display on computer system 900 or transmission to other devices via a communication link 918. Processor 912 may also control transmission of information, such as cookies or IP addresses, to other devices.

Components of computer system 900 also include a system memory component 914 (e.g., RAM), a static storage component 916 (e.g., ROM), and/or a disk drive 917. Computer system 900 performs specific operations by processor 912 and other components by executing one or more sequences of instructions contained in system memory component 914. Logic may be encoded in a computer readable medium, which may refer to any medium that participates in providing instructions to processor 912 for execution. Such a medium may take many forms, including but not limited to, non-volatile media, volatile media, and transmission media. In various implementations, non-volatile media includes optical or magnetic disks, volatile media includes dynamic memory, such as system memory component 914, and transmission media includes coaxial cables, copper wire, and fiber optics, including wires that comprise bus 902. In one embodiment, the logic is encoded in a non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 900. In various other embodiments of the present disclosure, a plurality of computer systems 900 coupled by communication link 918 to a network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for system identification, the method comprising:
   (1) receiving a set of flutter test data, the flutter test data being associated with sensor data obtained from a plurality of sensors coupled to a structure;
   (2) fitting curves to the flutter test data, wherein said curve-fitting comprises:
   (2A) identifying a set of fit equations, each fit equation corresponding to exactly one sensor, each sensor corresponding to one or more fit equations, wherein each fit equation comprises a first set of one or more first parameters, and comprises a second set of one or more second parameters for the corresponding sensor, wherein:
      each first parameter is present in fit equations corresponding to at least two sensors, and the first set depends on a frequency and a damping parameter of each vibrational mode in a set of one or more modes present in the fit equations for the at least two sensors; and
      each fit equation comprises one or more second parameters for the corresponding sensor and for no other sensor;
   (2B) determining a first parameter value for each first parameter;
   (2C) separately for each sensor, with each first parameter being fixed at the corresponding first parameter value, and each second parameter being treated as unknown, optimizing each fit equation corresponding to the sensor, to determine a second parameter value of each corresponding second parameter corresponding to the sensor;
   (2D) with each second parameter being fixed at the corresponding second parameter value, and each first parameter being treated as unknown, optimizing a fit error that combines residuals of all the fit equations for all the sensors, to determine a new first parameter value for each first parameter.

2. The method of claim 1, wherein:
   the sensor data was obtained from the structure subject to excitation events;
   for each sensor, each corresponding fit equation corresponds to exactly one excitation events;
   for at least one sensor, for each mode and each excitation, the corresponding second set comprises a corresponding mode shape amplitude parameter, a corresponding mode shape phase parameter, and a corresponding offset parameter;

in operation (2C), for each sensor, each fit equation is optimized by linear optimization;

in operation (2D), the fit error is optimized by non-linear optimization; and the method further comprises:

extracting one or more mode shape terms to obtain mode shape information from the set of flutter test data for the group of excitations; and outputting the mode shape information.

3. The method of claim 2, wherein in operation (2C), optimizing each fit equation comprises performing a variable substitution that places the fit equation into a form of a linear equation, and preforming a least squares closed-form optimization of the linear equation.

4. The method of claim 1, wherein the flutter test data comprises first set further comprises data obtained in a plurality of excitations; wherein the first set comprises an excitation level amplitude parameter and a phase parameter for each mode and each excitation.

5. The method of claim 1, wherein in operation (2C), optimizing each fit equation comprises inverting a substitution of variables for one or more second parameters to obtain the second parameter value for each second parameter.

6. The method of claim 1, wherein receiving the set of flutter test data comprises receiving flutter time history data in the form of sensor response and time pairs indexed by sensor, excitation event, and time points, the operation (2) is performed for a subset of the sensors, and the method further comprises using the parameters to provide mode shape information for a plurality of sensors outside the subset of sensors based on a fit of a subset of the sensors.

7. The method of claim 2, wherein formulating and solving the linear least squares problem provides an optimization of one or more frequency and damping and mode shape terms that reduces an amount of computation steps for solving the non-linear optimization.

8. The method of claim 1, wherein operation (2) is performed for a first set of a plurality of sensors; and the method further comprises performing operation (2C) for a second set of the plurality of sensors using the new first parameter values determined for the first set of the plurality of sensors, wherein the second set includes and is larger than the first set.

9. The method of claim 2, wherein step (2C) comprises evaluating residuals and using partial derivatives.

10. A system configured to perform the method of claim 1, the system comprising:

The plurality of sensors configured to provide the flutter test data from the structure subject to one or more excitation events, the flutter test data comprising machine-readable time history data corresponding to physical measurements taken by the sensors; and a processor configured to receive the machine readable time history data and preform the operation (2) to determine mode shape information about the structure, and output results of the operation (2).

11. The system of claim 10, wherein the structure is an aircraft fitted with the plurality of sensors for acquiring the flutter test data during flight.

12. The system of claim 10, wherein the process if further configured to preform the operation (2) repeatedly to obtain a sequence of iterations of operation (2), wherein each subsequent iteration comprises a new set of fit equations with more modes than in the immediately preceding iteration, wherein in operation (2B) in each subsequent iteration, at least one first parameter value for at least one new mode is obtained based on the optimized fit error in the immediately preceding iteration;

wherein in each iteration, in operation (2C), each fit equation is optimized using a closed from shape fit.

13. The system of claim 10, wherein the processor is further configured to perform the closed form shape fit to formulate the linear least squares problem, including perform a variable substitution that places a fit equation into a form of a simple linear equation for which a least squares can be performed to find optimal values of the mode shape terms.

14. The system of claim 10, wherein the processor is further configured to perform the closed form shape fit to solve the linear squares problem in equations resulting from a substitution of variables for mode shape terms and excitation terms in a fit equation.

15. The system of claim 10, wherein the processor is further configured to perform the closed form shape fit to extract one or more mode shape terms resulting from solving the linear least squares problem in equations resulting from a substitution of variables for mode shape terms and excitation terms in the fit equation, including inverting the substitution of variables for mode shape terms and excitation terms to obtain one or more mode shape terms and excitation terms for the fit equation.

16. The method of claim 1, wherein the processor is configured to perform the operation (2) for a first set of the plurality of sensors; and is further configured to perform operation (2C) for the second set of the plurality of sensors using the first parameter values determined in the operation (2D) for the first set of the plurality of sensors, wherein the second set includes and is larger than the first set.

17. The system of claim 10, wherein the processor is further configured to:

load one or more parameters from the series of damped sine curves into the fit equation;

use the mode shape information obtained from using the closed form shape fit to solve the linear squares problem to determine a fit equation offset and a mode shape amplitude and phase; and compute one or more residuals of the fit equation.

18. The method of claim 1, further comprising repeating operation (2) one of more times to obtain a sequence of iterations of operation (2), wherein each subsequent iteration comprises a new set of fit equations with more modes than in the immediately preceding iteration, wherein in operation (2B) in each subsequent iteration, at least one first parameter value for at least one mode is obtained based on the optimized fit error in the immediately preceding iteration.

19. The method of claim 18, wherein in operation (2B) in each subsequent iteration, the first parameter values comprise the new first parameter values obtained in operation (2D) in the immediately preceding iteration.

20. The method of claim 1, wherein the sensor data were obtained in a plurality of excitation events;

for each sensor, each corresponding fit equation corresponds to exactly one excitation event, and comprises one or more first parameters dependent on amplitude level of the corresponding excitation event and on a frequency of the corresponding excitation event;

for each sensor, each corresponding fit equation comprises one or more second parameters dependent on the corresponding excitation event but does not have any second parameters dependent on any other excitation event.

21. A non-transitory computer-readable medium comprising instructions which, when executed by a processor, causes the processor to:
  receive flutter test data comprising time history data corresponding to an excitation of a structure from measurements taken by a plurality of sensors attached to the structure;
  identify a set of fit equations, each fit equation corresponding to exactly one sensor, each sensor corresponding to one or more fit equations, wherein each fit equation comprises a first set of one or more first parameters, and comprises a second set of one or more second parameters for the corresponding sensor, wherein:
    each first parameter is present in fit equations corresponding to at least two sensors, and the first set depends on a frequency and a damping parameter of each vibrational mode in a set of one or more modes present in the fit equations for the at least two sensors; and
    each fit equation comprises one or more second parameters for the corresponding sensor and for no other sensor;
  determining a first parameter value for each first parameter;
  separately for each sensor, with each first parameter being fixed at the corresponding first parameter value, and each second parameter being treated as unknown, optimize each fit equation corresponding to the sensor, to determine a second parameter value of each corresponding second parameter corresponding to the sensor;
  with each second parameter being fixed at the corresponding second parameter value, and each first parameter being treated as unknown, optimizing a fit error that combines residuals of all the fit equations for all the sensors, to determine a new first parameter value for each first parameter.

* * * * *